Nov. 5, 1929.  E. C. AMSDEN  1,734,889
METHOD OF MAKING STANDARDS
Filed Aug. 9, 1926   5 Sheets-Sheet 1

INVENTOR:
Eugene C. Amsden
BY Henry T. Williams,
ATTORNEY

Nov. 5, 1929.　　　　E. C. AMSDEN　　　　1,734,889
METHOD OF MAKING STANDARDS
Filed Aug. 9, 1926　　　5 Sheets-Sheet 2
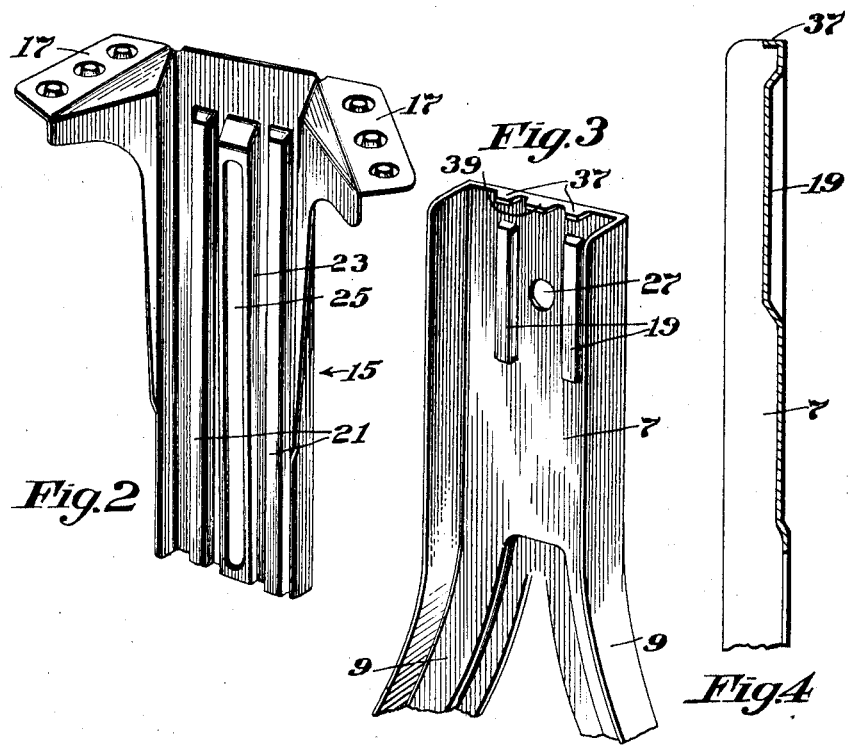
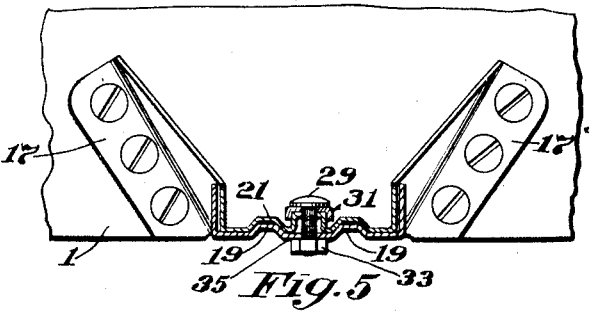
INVENTOR:
Eugene C. Amsden
BY Henry T. Williams
ATTORNEY Nov. 5, 1929.   E. C. AMSDEN   1,734,889
METHOD OF MAKING STANDARDS
Filed Aug. 9, 1926   5 Sheets-Sheet 4
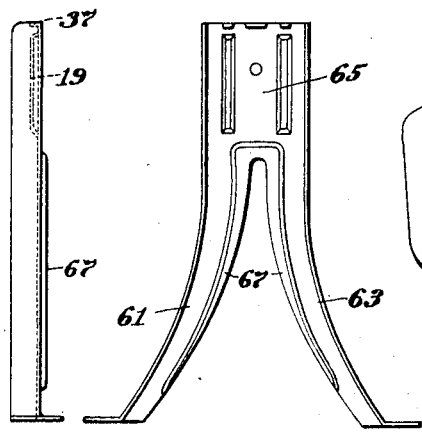
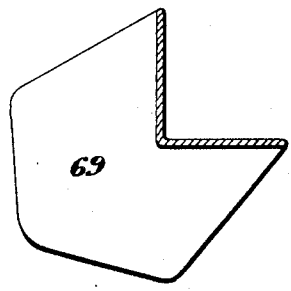
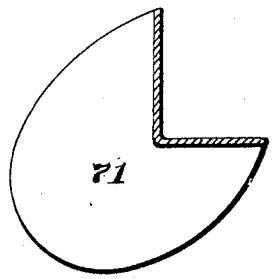
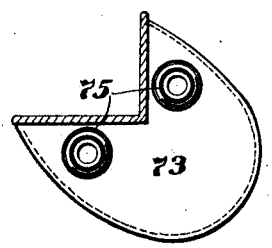
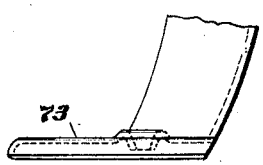
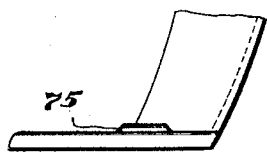
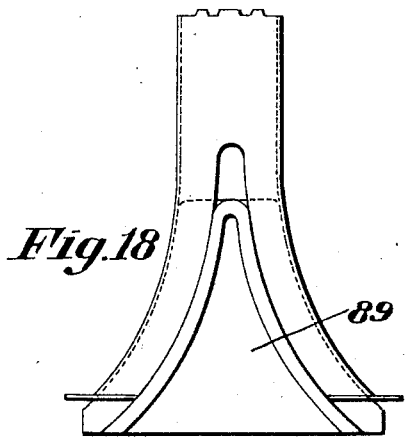
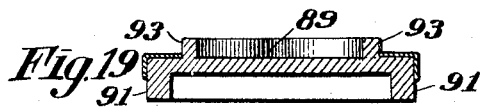
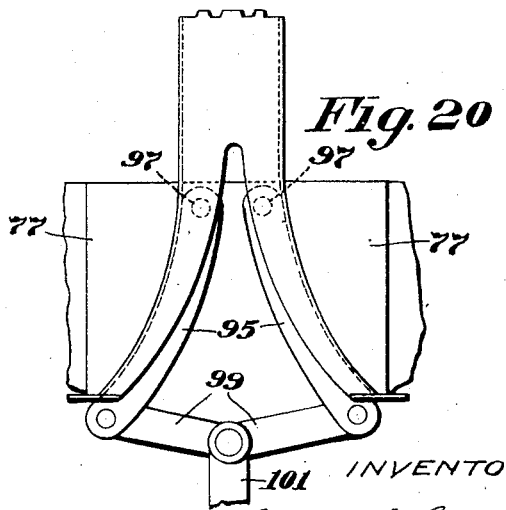
INVENTOR:
Eugene C. Amsden
BY Henry T. Williams,
ATTORNEY

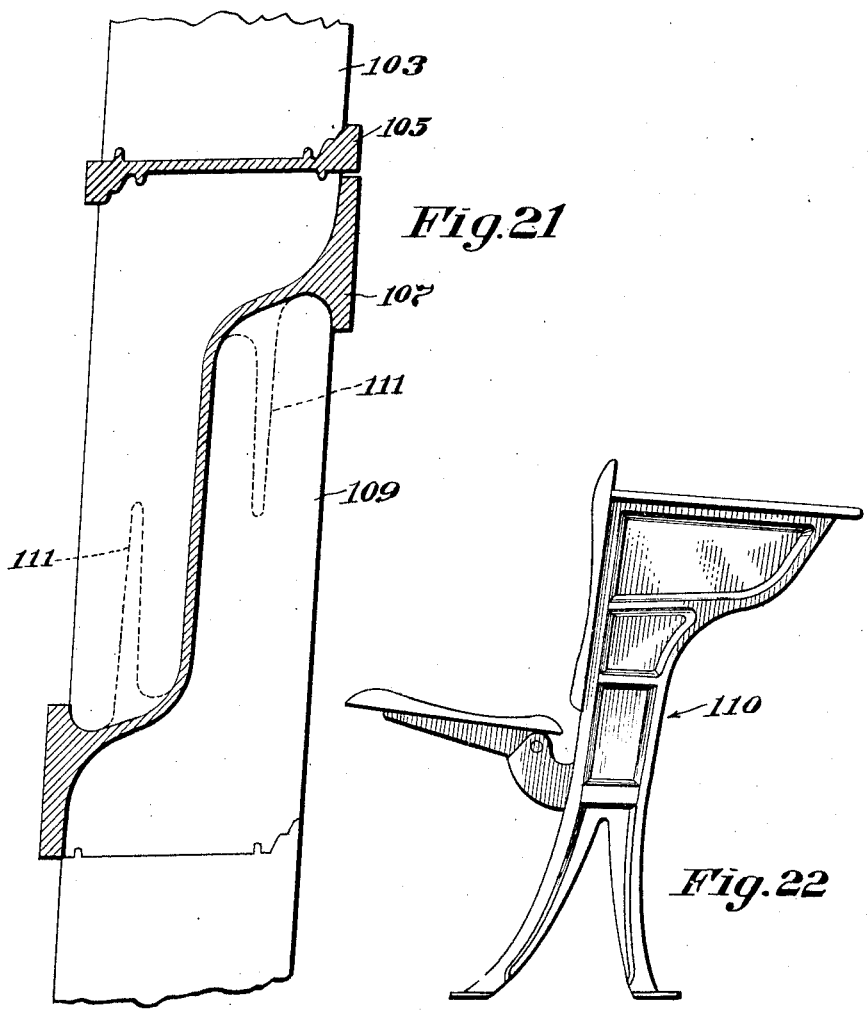

Patented Nov. 5, 1929

1,734,889

UNITED STATES PATENT OFFICE

EUGENE C. AMSDEN, OF BOSTON, MASSACHUSETTS, ASSIGNOR TO AMSDEN & BARNARD, INC., OF BOSTON, MASSACHUSETTS, A CORPORATION OF MASSACHUSETTS

METHOD OF MAKING STANDARDS

Application filed August 9, 1926. Serial No. 127,999.

The invention to be hereinafter described relates to a method of making standards for school furniture. In the practice of the method the standard is formed from sheet metal by suitable dies with economy of material, and a standard of desirable construction is produced.

The method is applicable to the manufacture of standards of different types. One is an adjustable standard comprising a base member which rests on the floor and an upper member which carries a desk and is mounted on and adapted to be adjusted along the base member in order that the desk may be set at the elevations desired. Another type is a fixed standard which is not adjustable and in some uses is adapted to support both a desk and a seat, in other uses a desk only and in still other uses a seat only.

The base member of the adjustable standard and the fixed standard have bodies, and legs which have a spread substantially greater than the width of the bodies. These standards preferably are made of sheet steel which is expensive and therefore it is necessary that there shall be as little waste as possible in the manufacture thereof.

In the practice of the method blanks are died out of sheet steel stock and desirably from a long narrow strip of the width required for the body of the standard. Each blank has a notch extending a portion of the length thereof to provide legs for the body. these legs in the flat blank necessarily have substantial width and the problem is to spread these legs apart the desired extent in the direction of the plane of the body of the blank and without heating the metal and without mutilation or distortion. To accomplish this, first the flat blank is pressed to form flanges along the legs which reduces the width of the portions of the legs in the plane of the blank and facilitates the subsequent bending thereof. Then the legs are spread apart by applying pressure to the flanges of the legs. These flanges bend more easily than the other portions of the legs and present ample surfaces to be engaged by the dies. By applying the pressure to the flanges there is much less tendency for the metal to buckle than if the pressure were applied merely to the inner edges of the legs. It is found in practice that the legs can be readily bent and spread apart and a good produce can be obtained by the present method, and much less stock is wasted than if the body and outstanding legs were given their form in the operation of cutting the blank from wide sheet stock.

It is not practicable to form the standards from commercial standard channels, since they are too thick and costly. In my method I prefer to start with flat sheet metal stock which is substantially thinner, lighter and less expensive, and by forming the standards as described herein, although of thin stock, they have the stiffness and strength required for the purposes which they serve.

The character of the invention may be best understood by reference to the following description of the method and the standards produced thereby shown in the accompanying drawings, wherein:

Fig. 2 is a perspective view of the upper or adjustable member which is adapted to be secured to the bottom of the desk;

Fig. 3 is a perspective view of a portion of the base member;

Fig. 4 is a vertical section through a portion of the base member;

Fig. 5 is a horizontal section through one of the standards looking up toward the bottom of the desk;

Figs. 6 to 9 and 11 to 17 illustrate steps in the method of forming the base member of the standard;

Figs. 10, 18, 19 and 20 illustrate methods of spreading the legs of the standard;

Fig. 21 shows dies for transversely cutting sheet metal strip stock in the production of a standard for supporting both a desk and a seat; and Fig. 22 is a side elevation of a combined desk and seat standard having its legs spread apart by the method practiced in making the base member of the adjustable standard.

Figure 1:
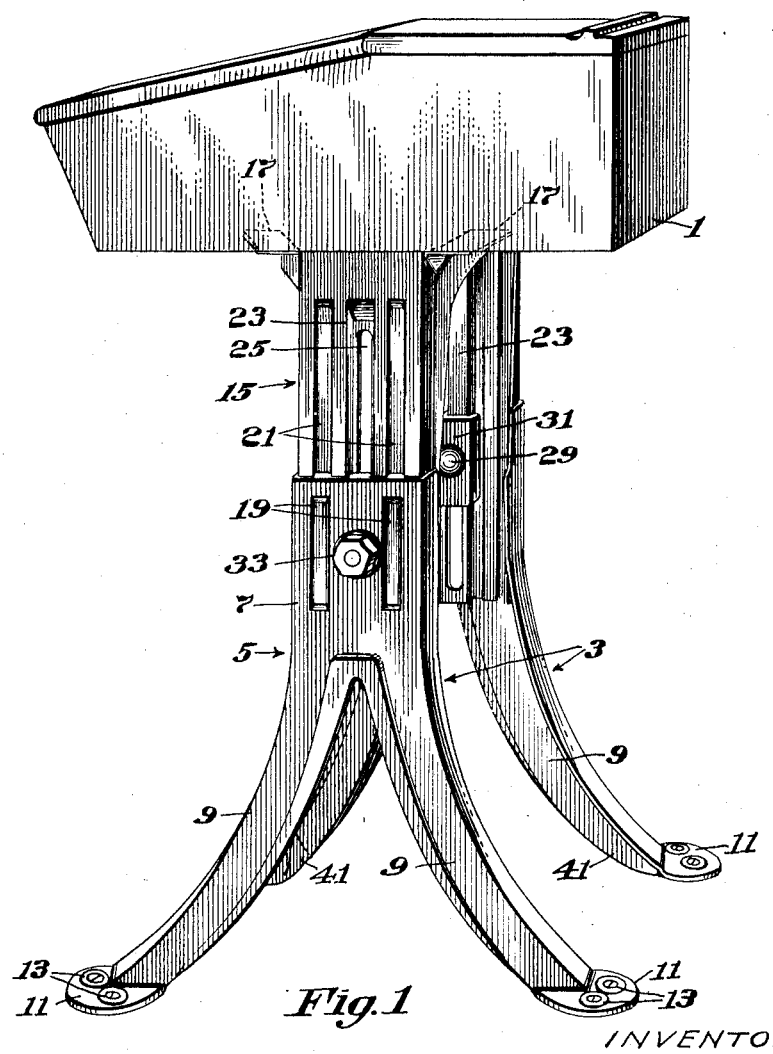
Fig. 1 is a perspective view of a school desk equipped with standards embodying the invention.

Referring to the drawings, 1 designates a desk of usual construction which is supported on a pair of standards 3, and since these standards are similar in construction, a description of one will suffice for both.

This standard comprises a base member 5 which is formed from sheet steel or other suitable metal by the method to be hereinafter described. The base member has a channel-shaped body 7 and a pair of angle-shaped legs 9 extending downward therefrom, said legs being curved outward and ending in feet 11 which are spread a substantial distance apart, and in the present instance the spread is substantially greater than the width of the body 7. The feet are slightly cupped and have holes 13 for receiving screws for securing the standard to the floor.

The standard has a channel-shaped adjustable member 15 formed from sheet steel or other suitable metal. At the top of the adjustable member are outstanding flanges 17 provided with holes for receiving screws for securing said flanges to the bottom of the desk.

The base member has a pair of ribs 19 extending longitudinally thereof and wedge-shaped in transverse section, and mating with these ribs are a pair of grooves 21 extending longitudinally of the adjustable member and also wedge-shaped in transverse section.

The adjustable member has a strengthening rib 23 extending longitudinally thereof and located between the grooves 21, said rib having an elongated slot in the back thereof which is in line with a hole 27 in the body of the base member.

Projecting through the hole and slot is a bolt 29 which also extends through a hole in a clamp 31 of channel shape and adapted for engagement with the rib 23 of the adjustable member. The bolt is provided with a nut 33 and a washer 35 is interposed between the nut and the front face of the body of the base member.

At the upper end of the base member are a pair of lips 37 and an intermediate lip 39. The lips 37 enter the grooves 21 and the lip 39 enters the groove formed by the rib 23. The lips of the base member may be engaged by the upper ends of the grooves of the adjustable member to limit downward movement of the latter.

Adjacent the juncture of the legs with the feet of the base member are shields 41 provided to prevent collection of dust back of the feet and to facilitate sweeping dust from the floor around the feet.

When it is desired to raise or lower the adjustable member relatively to the base member, the nut 33 is loosened, thereby permitting the adjustable member to be moved up or down, and after the adjustable member is at the elevation desired, the nut 33 is tightened, thereby causing the bolt to cooperate with the clamp and draw the upper member toward the base member and press the wedge-shaped grooves 21 of the upper member tightly against the wedge-shaped ribs of the base member to secure the upper member to the base member.

Figure 6:
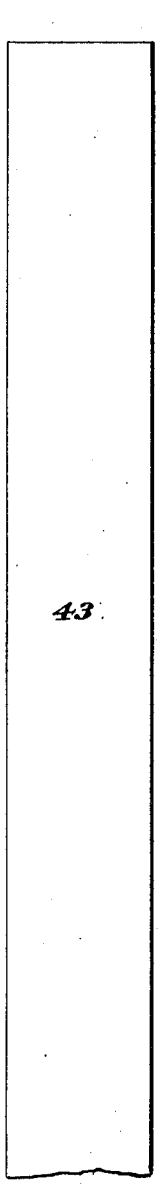
Figure 7:
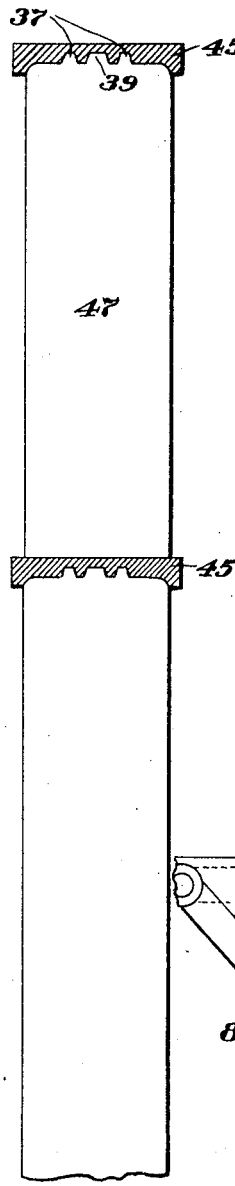

The method of making the base member of the standard will now be described. First, a strip 43 (Fig. 6) of sheet steel or other suitable material is selected and is transversely cut by a die 45 (Fig. 7) suitably shaped to form the lips 37 and 39 above referred to. Then the strip is advanced beneath the die the proper distance to provide a blank 47 of appropriate length for the production of the base member. The die 45 is then caused to cut the strip transversely, and the latter is advanced and the die operated successively to cut additional blanks from the strip.

Figure 8:
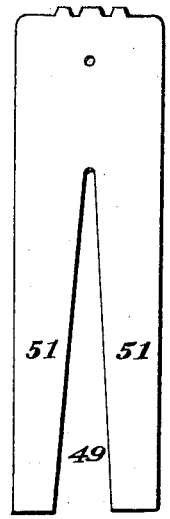

A notch (Fig. 8) is died out of the blank to form flat legs 51, and in the same operation the bolt receiving hole may be made in the body of the blank. Then by suitable dies the blank is pressed to form a flange 53 (Fig. 9) and a foot 55 at one side of the blank, and a flange 57 and a foot 59 at the opposite side of the blank.

Then the angle-shaped legs are spread apart and bent outward with a gradual curvature to produce the curved legs 61 and 63 (Fig. 12). It is not indispensable that both of the legs shall be curved, but it is desirable that the feet shall be spread a substantial distance apart and a distance which is greater than the width of the channel-shaped body. The legs are bent away from each other in the direction of the plane of the blank, and this may be accomplished by a variety of dies, some of which will be hereinafter described.

In the next operation the ribs 19 and offset marginal portions 67 (Figs. 11 and 12) are pressed outward in opposite directions from the plane of the blank, and in this same operation the three lips at the end of the member may be bent to positions in which they are perpendicular to the plane of the body of the base member.

Figure 9:
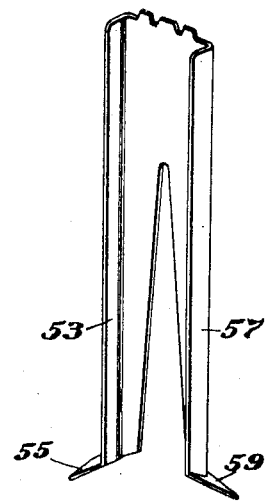

Each of the feet, when preliminarily formed by the operation shown in Fig. 9, has the form of the foot 69 (Fig. 13). Next they are trimmed, as shown in Fig. 14. They are then pressed to give them the cup-shaped form of the foot 73 (Figs. 15 and 16), and in the same operation countersunk holes 75 may be formed in the feet. In the course of the cupping of the feet, the edges of the cups become bevelled, as will be noted in Fig. 16, so that in the next operation the feet are pressed to square or flatten the edge, and to flatten the feet and give the same the form shown in Fig. 17.

Figure 10:
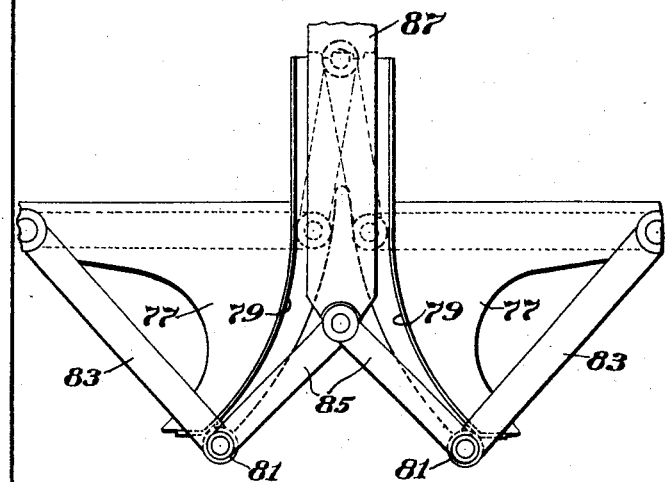

As stated, the legs of the base member may be spread by a variety of methods. According to one method a pair of dies 77 (Fig. 10) are provided having edges 79 with the curvature desired for the legs. A pair of rollers 81 are carried by links 83 pivotally mounted on the dies 77. Connected to the links 33 is a toggle 85 and connected to the toggle is an actuator 87 which may be operated by a suitable press or the like. When it is desired to bend the legs, the blank is placed between the dies 77 with the rollers 81 and 83 in the position shown in dotted lines in Fig. 10. Then the actuator 87 is operated to impart a straightening movement to the toggle, and this will cause the rollers 81 to move along the flanges of the legs and operate through said flanges to bend the same to and in conformity with the curved faces 79 of the dies 77.

In another method for spreading the legs, a die 89 (Figs. 18 and 19) is used. This die is of general wedge-shaped form and has faces 91 for engagement with the flanges of the legs and in addition may have faces 93 for engagement with the inner edges of the legs. This wedge-shaped die is thrust endwise between the legs and spreads them apart until they meet the curved faces 79 of the dies 77 referred to, and have a curvature in conformity with said faces.

In still another method of spreading the legs, a pair of curved arms 95 (Fig. 20) are employed, pivotally mounted on pivot pins 97 suitably supported. The outer ends of these arms are connected to a toggle 99 provided with an actuator 101 which may be operated by suitable means, unnecessary to disclose herein. When the actuator is operated to give the toggle 99 a straightening movement, it will rock the arms 95 away from each other, and they will engage the flanges of the legs and bend the legs into engagement with the curved faces 79 of the dies 77 referred to.

It will be understood that in the use of each of the several forms of dies above described, they operate to bend the legs progressively along the lengths of the legs, so that the degree of bending from point-to-point along the same is slight. This is an important factor in preventing buckling or other distortion of the legs during the bending operation.

It will be observed that the spreading of the legs permits the manufacture of a standard from a narrow blank, the standard when finished, however, having feet which are spread apart by a distance considerably greater than the initial width of the blank. This obviously effects a very material saving in stock. Since the spreading of the legs takes place, as above stated, in the plane of the blank itself, or in a plane substantially parallel to that of the blank, there is a very strong tendency for the metal to buckle during the spreading operation, particularly when this operation is performed with the metal at ordinary temperatures, which is the preferred practice. This difficulty is overcome according to the present invention by flanging the legs prior to the bending operation. This reduces the width of metal that must be spread in its own plane, and it is of further advantage since the legs can be spread apart far more easily by applying pressure to the blanks than otherwise would be possible.

While the method has been described more particularly with reference to the manufacture of a standard having a base member and an adjustable member, it will be understood that the method may be used in the manufacture of the fixed standards above referred to.

It will be understood that it is not necessary in the practice of the method that the steps shall be performed in the order recited above. For example, the notch or slot cut in the blank to form the legs may be made after the blank has been pressed to form the flanges extending along the edges thereof, or the notch and the flanges may be produced in one operation, or the notch may be made in the blank concurrently with the severance of the same from the stock, and the order of the steps employed in forming the feet at the end of the legs may be varied. In fact, the procedure followed necessarily will vary somewhat with the shape and dimensions of the standard, and particularly with the equipment available to make these articles. This is true both in regard to the order in which some of the steps are performed, the combining of certain steps, and the particular method employed to spread the legs. For instance, the exact procedure may be modified in accordance with the size and length of stroke of the presses available.

It will also be understood that while I prefer from considerations of economy to cut the blanks from flat sheet metal strip stock, they can, nevertheless, at a somewhat increased expense, be made by dieing them out of wide sheet stock.

Referring more particularly to Figs. 21 and 22, sheet metal strip stock may be transversely cut at intervals by a die 105 and a die 107, thereby to form blanks 109 suitable for making standards such as the standard 110. Notches 111 may be made in the blanks, and this might be accomplished by giving the die 107 a suitable form for this purpose, or the notches may be produced in an operation subsequent to the transverse cutting of the strip stock.

Each blank thus produced may be pressed to form flanges and feet at opposite sides thereof, and the legs of the blank may be spread apart by any of the methods described above, with slight alteration in the form of the dies.

This application is a continuation in part of my application Serial No. 28,101, filed May 5, 1925.

It will be understood that the invention is not limited to the specific method disclosed herein, and that various deviations may be made therefrom without departing from the spirit and scope of the appended claim.

What is claimed is:—

That improvement in the method of manufacturing standards for school furniture which consists in providing a metal blank having a body and two legs extending from one end of said body, forming flanges along edges of said legs, and without heating the metal, applying pressure progressively along and against the inner face of the flange of at least one of the legs to curve said leg and spread the ends of the legs a substantial distance apart, and providing feet at the ends of the legs.

EUGENE C. AMSDEN.